United States Patent [19]
Schroeder

[11] 3,950,741
[45] Apr. 13, 1976

[54] ACCESSORY OUTAGE MONITORING CIRCUITRY

[75] Inventor: Thaddeus Schroeder, Sterling Heights, Mich.

[73] Assignee: General Motors Corporation, Detroit, Mich.

[22] Filed: Oct. 29, 1974

[21] Appl. No.: 518,519

[52] U.S. Cl. .................................. 340/251; 338/23
[51] Int. Cl.² ........................................ G08B 21/00
[58] Field of Search ........ 340/251, 249, 253, 244 R; 338/22, 25, 23; 219/505

[56] References Cited
UNITED STATES PATENTS

| | | | |
|---|---|---|---|
| 3,252,137 | 5/1966 | Montgomery | 340/251 X |
| 3,307,167 | 2/1967 | Race | 340/253 |
| 3,316,184 | 4/1967 | Nagase et al. | 338/22 R |
| 3,432,840 | 3/1969 | Neapolitakis et al. | 340/244 R |

Primary Examiner—John W. Caldwell
Assistant Examiner—Daniel Myer
Attorney, Agent, or Firm—Albert F. Duke

[57] ABSTRACT

The load monitoring circuit includes a solid state current sensor including a positive temperature coefficient (PTC) resistor and a heater resistor. The heater resistor is connected in series with the load and in parallel with the PTC resistor. A third resistor is connected in series with the PTC to form a voltage divider. Current drawn by the load through the heater resistor raises the temperature of the PTC resistor above its anomaly temperature causing the voltage at the divider junction to abruptly switch from a high to a low state to indicate the status of the load.

3 Claims, 2 Drawing Figures

ACCESSORY OUTAGE MONITORING CIRCUITRY

This invention relates generally to monitoring circuitry and more particularly to current sensitive, accessory outage monitoring circuitry exhibiting very small insertion loss.

Lamp outage indicators are well known in the prior art and are frequently used in applications where the lamps are in a position where they are not easily observed. These indicators may take the form, for example, of a resistive bridge or a pair of oppositely wound coils, which sense the current imbalance generated by a lamp failure. In addition, lamp failure indicators have utilized various current sensitive relays. These relays include the well known contact arrangement in which a movable contact is mounted on a pivotally supported armature which in turn is biased, typically by means of a spring to the open position. The magnetic flux levels required for both closing the contact and holding the contacts closed are substantial and relatively large amounts of power are, therefore, consumed for these operations, consequently reducing the power available to operate the lighting circuit being monitored. In addition to the relatively large amounts of power that are consumed, these relays exhibit a relatively short life and their characteristics change during their lifetime because, among other things, the spring rate of the biasing spring deteriorates with time. In order to overcome some of these drawbacks of the prior art relay type systems a sensitive read relay switch has been proposed. One of the problems associated with the use of sensitive read relays is that in an automotive environment the relays are subject to failure due to vibration.

It is an object of the present invention to provide a rugged and very inexpensive solid state circuit for sensing accessory outage and which can generate relatively large voltage output signals without any additional amplifying circuitry.

It is another object of the present invention to provide a load monitoring circuit utilizing a sensor which produces only a negligible insertion loss.

It is another object of the present invention to provide an accessory outage sensing circuit which exhibits an inherent turn-on delay of a few seconds resulting in a self-checking operation whenever an accessory is activated.

It is another object of the present invention to provide an accessory outage sensor and circuitry which employs no moving parts and hence is insensitive to vibration.

The accessory outage circuit of the present invention comprises a thermally coupled current sensor which includes a PTC (Positive Temperature Coefficient) ceramic chip which has deposited thereon a small heater resistor which is electrically insulated from while providing good thermal coupling with the PTC ceramic. The heating resistor is inserted between an accessory such as a lamp and a switch which controls energization of the accessory. The PTC ceramic is electrically connected in series with a second resistor forming a voltage divider network which is connected across the heater resistor and the accessory. The PTC ceramic exhibits an abrupt change of electrical resistance when heated above its anomaly temperature. The resistance increase can be as large as 10,000 times over a temperature range of some 70° C. and 1000 times over the first 10° C. above the anomaly temperature. The anomaly temperature and the resistance levels of the PTC ceramic are predetermined during the manufacturing process by the adjustment of chemical composition and processing variables. The anomaly temperature can be adjusted to any value in the range of 65°–180° C. Below the anomaly temperature the resistance of the PTC resistor is low and fairly constant. The second resistor and the PTC resistor form a low current voltage divider. When the accessory switch is open there is no sensor output voltage. Closing the switch causes current to flow through the heater resistor to the accessory. Energy dissipated in the heater resistor heats the PTC resistor. Before the PTC resistor reaches the anomaly temperature it has a low resistance and the voltage at the junction between the PTC resistor and the second resistor is substantially the supply voltage. In a few seconds the PTC resistor heats beyond the anomaly point and the output voltage drops to a small value. The initial high output voltage during the delay period indicates to the driver that the sensor is working properly. In case the accessory is burned out, there is no current flow through the heater resistor but the closure of the accessory switch supplies voltage to the voltage divider and the output voltage remains high indicating an accessory malfunction.

A more complete understanding of the present invention may be had from the following detailed description which should be read in conjunction with the drawings in which.

Figure 1:
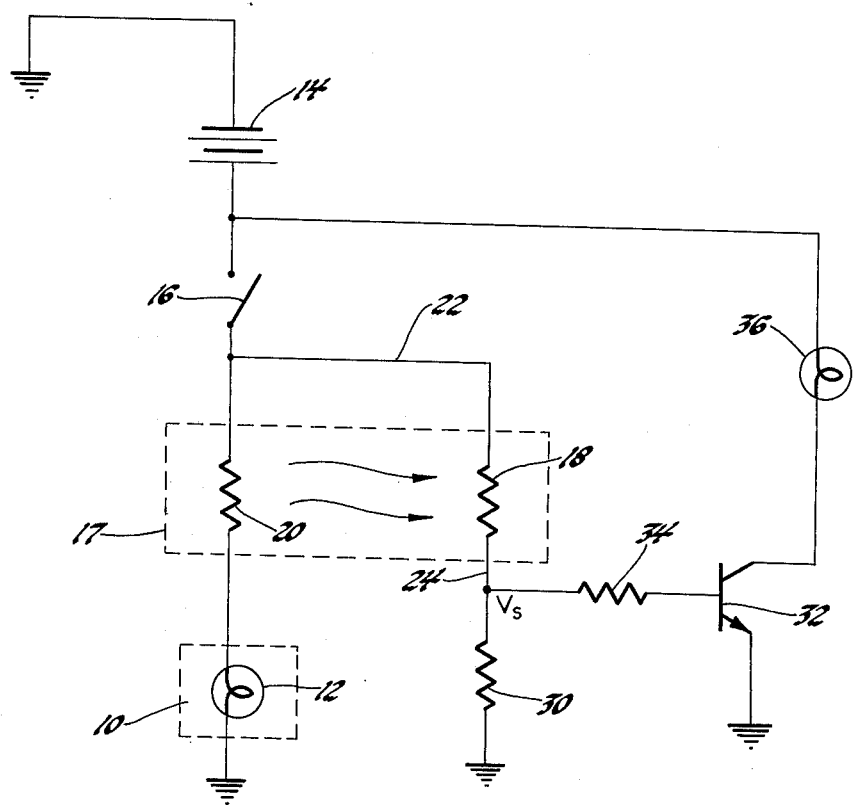
FIG. 1 is a schematic diagram of the accessory outage sensing circuit of the present invention.
Figure 2:
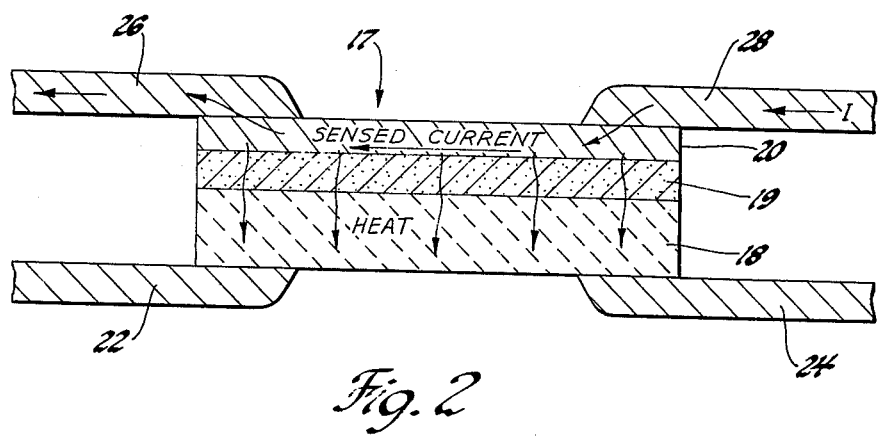
FIG. 2 is a cross-sectional view of a preferred sensor configuration.

Referring now to the drawings and initially to FIG. 1, an automobile accessory generally designated 10 which may be one of the lamps 12 on a motor vehicle is connected with a source of DC potential such as the vehicle battery 14 through an accessory switch 16. An outage sensor 17 comprises a PTC resistor 18 and a heater resistor 20. As shown in FIG. 2, the sensor 17 is an integrated structure with the PTC resistor 18 forming a substrate of ceramic titanates having output leads 22 and 24 appropriately attached thereto. The PTC ceramic chip 18 supports a thin layer of alumina 19 or other good thermal conductor which is deposited on the surface of the PTC chip 18 and sandwiched between the heating resistor 20 which is deposited on the surface of the alumina 19. Input leads 26 and 28 are attached to the ends of the heating resistor 20. Referring again to FIG. 1, the output lead 22 of the sensor 17 is connected to a junction between the heater resistor 20 and the accessory switch 16 while the output lead 24 is connected with a resistor 30 to ground. The junction between the voltage divider comprising the PTC resistor 18 and the resistor 30 is connected with the base of a transistor 32 through a current limiting resistor 34. The emitter of the transistor 32 is connected with ground while the collector is connected to the battery 14 through an indicator lamp 36. The value of the resistor 20 is determined by the nominal current drawn by the accessory 10 and is on the order of several milliohms since only about 50 milli-watts of power is needed to heat the small mass of the PTC ceramic constituting the resistor 18. Hence, there is a very small insertion loss. The value of resistor 30 is selected to be 10–30 times larger than the resistance of the resistor 18 below the anomaly temperature. Thus, current flow through resistor 18 is too low to cause any appreciable self-heating of the resistor 18.

In operation, when the switch 16 is open there is no output voltage $V_s$ from the sensor 17. When the switch 16 is closed current flows through the heater resistor 20 to the lamp 12. Energy dissipated in the resistor 20 heats the PTC resistor 18. However, before the PTC resistor 18 reaches the anomaly temperature it has a low resistance and the sensor output voltage $V_s$ is 90–97% of the voltage of the battery 14. In a few seconds the PTC resistor 18 heats beyond the anomaly point and the output voltage $V_s$ drops to 1–3% of the voltage of the battery 14. The initial high output voltage $V_s$ during the delay period indicates to the driver that the sensor 17 is properly working. Should the lamp 12 burn out, no current flows through the resistor 20 but voltage is supplied to the voltage divider through the switch 16 so that the output voltage $V_s$ remains high indicating an accessory malfunction.

Having thus described my invention what I claim is:

1. A load monitoring circuit comprising:
   - a series network including a d-c voltage source, a load and load controlling switch means;
   - a current sensor including a positive temperature coefficient of resistance (PTC) and a heater resistor, said PTC resistor exhibiting an abrupt change of resistance above a predetermined anomaly temperature, said heater resistor connected in said series network and thermally coupled with said PTC resistor;
   - a third resistor connected in series with and forming a voltage divider network with said PTC resistor, said voltage divider network being connected with said source through said switch means and in parallel electrical circuit relationship with said heater resistor and said load, the resistance of said third resistor being substantially larger than the resistance of said PTC resistor below the anomaly temperature of said PTC resistor to prevent any substantial self-heating of said PTC resistor whereby the voltage level at a junction of said voltage divider network between said PTC resistor and said third resistor is initially high upon closure of said switch means and subsequently goes low if said load is operable, and
   - means responsive to the voltage at said junction for monitoring the operation of said load.

2. The circuit defined in claim 1 wherein said sensor is an integrated structure comprising a conductive PTC ceramic substrate having output leads attached at opposite ends thereof, a layer of electrical insulative material deposited on said substrate and a layer of resistive material deposited on said insulative material, said insulative material providing good thermal conductivity between said resistive material and said ceramic substrate, and input leads attached to said resistive material.

3. The circuit defined in claim 1 wherein said monitoring means comprises an indicator lamp, a transistor having emitter, base and collector electrodes, means connecting said lamp across said source through the emitter-collector electrode of said transistor, a fourth resistor connecting the base of said transistor to said junction of said voltage divider network whereby said indicator lamp is initially energized upon closure of said switch means and remains energized for a predetermined time interval as an indication that said current sensor is operative.

* * * * *